United States Patent [19]

Raffoni

[11] Patent Number: 5,758,812
[45] Date of Patent: Jun. 2, 1998

[54] LAMINAR STAPLE FOR JOINING AT AN ANGLE PROFILED STRIPS

[76] Inventor: Giuseppe Raffoni, Viale D. Bolognesi, 24-47100 Forli' , Italy

[21] Appl. No.: 756,742

[22] Filed: Nov. 26, 1996

[30] Foreign Application Priority Data

Mar. 1, 1996 [IT] Italy ................... B0960022 U

[51] Int. Cl.⁶ ........................................... F16B 15/00
[52] U.S. Cl. ........................ 227/120; 227/107; 227/156; 411/461; 411/912
[58] Field of Search ........................... 227/107, 108, 227/109, 110, 119, 120, 139, 148, 149, 152, 156; 411/461, 912

[56] References Cited

U.S. PATENT DOCUMENTS

| | | | |
|---|---|---|---|
| 4,436,234 | 3/1984 | Kennedy | 227/30 |
| 4,572,420 | 2/1986 | Pistorius | 227/110 |
| 4,574,452 | 3/1986 | Kennedy et al. | 227/148 |
| 4,699,307 | 10/1987 | Kozyrski et al. | 227/109 |
| 4,830,257 | 5/1989 | Lin | 227/152 |
| 5,390,842 | 2/1995 | Joyce | 227/110 |

FOREIGN PATENT DOCUMENTS

| | | |
|---|---|---|
| 0 479 182 | 4/1992 | European Pat. Off. . |
| 2 311 210 | 12/1976 | France . |
| 8 606 071 | 4/1986 | Germany . |

*Primary Examiner*—Scott A. Smith
*Attorney, Agent, or Firm*—Guido Modiano; Albert Josif

[57] ABSTRACT

Laminar staple for staple driving machines having a loader which includes a guide channel with a cross section that is complementary to the shape of the staple. The staple includes two walls substantially perpendicular to each other and defines a corner and two ribs extending substantially perpendicularly to the walls. The walls and the ribs of the staple have a cutting edge and at least one of the ribs is provided at the end opposite to the cutting edge with a chamfer cooperating with a respective relief formed in the channel of the loader.

6 Claims, 5 Drawing Sheets

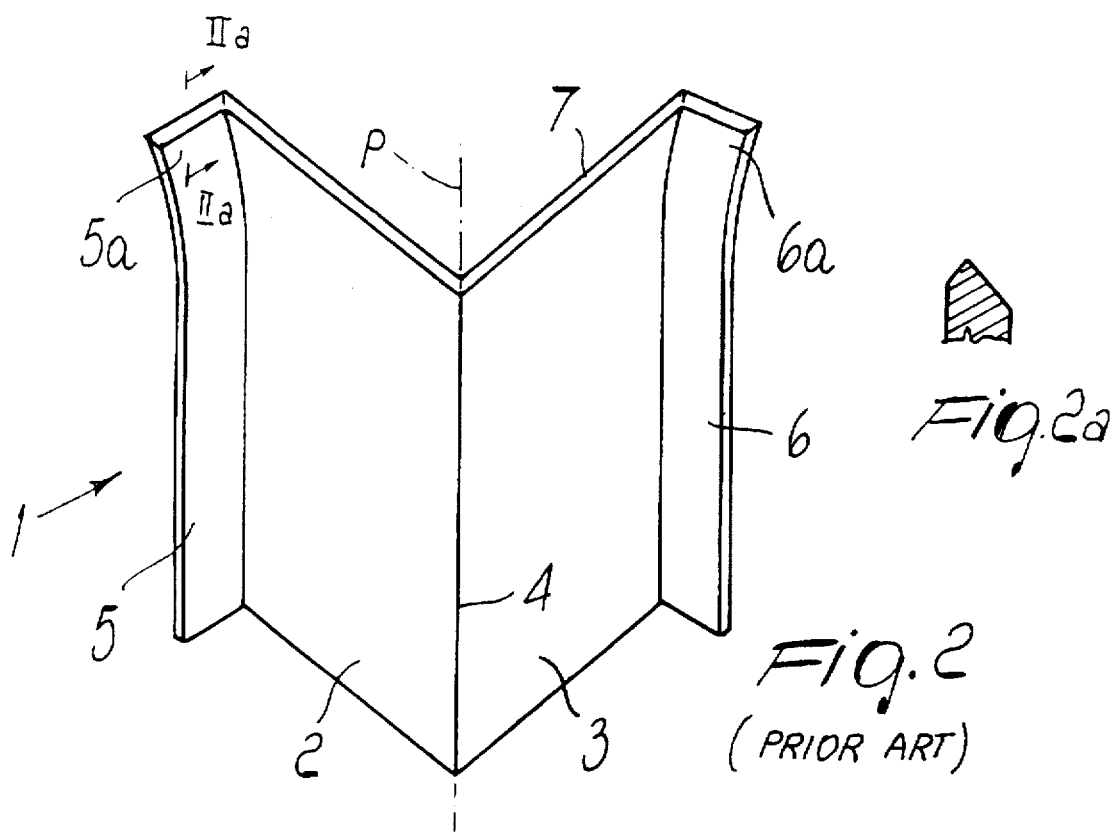
Fig. 2a
Fig. 2
(PRIOR ART)
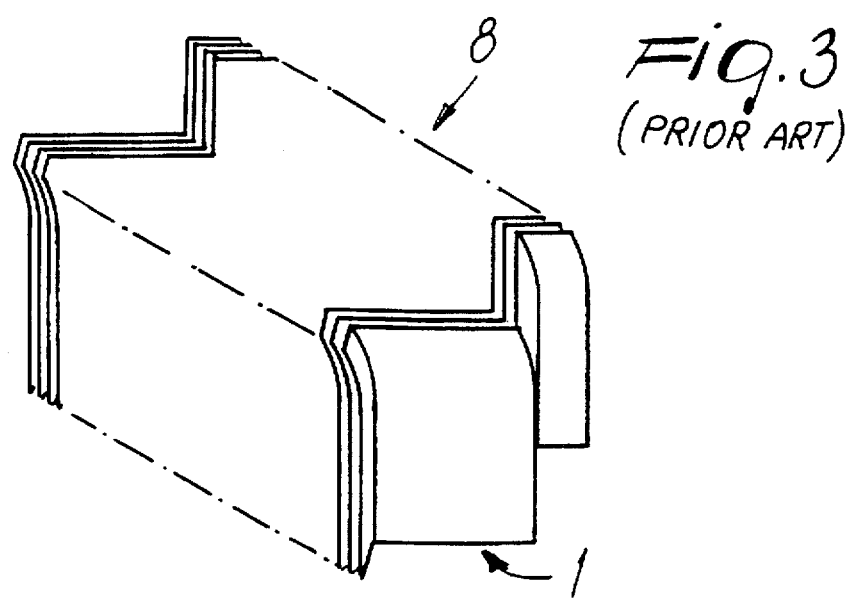
Fig. 3
(PRIOR ART)

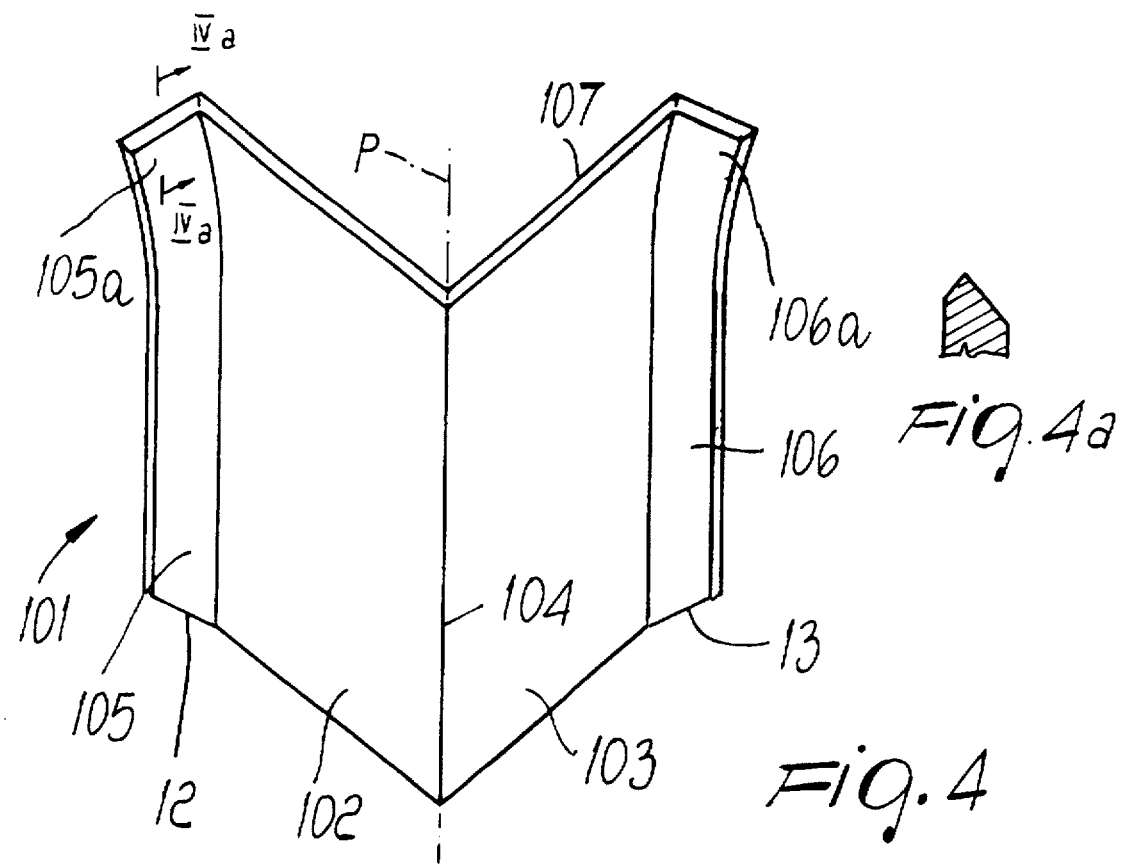
Fig.4a
Fig.4
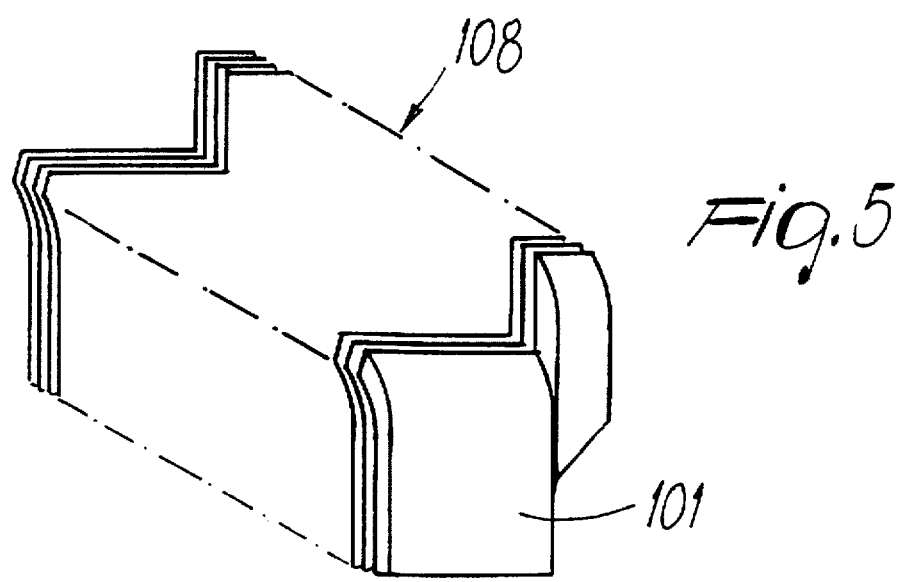
Fig.5

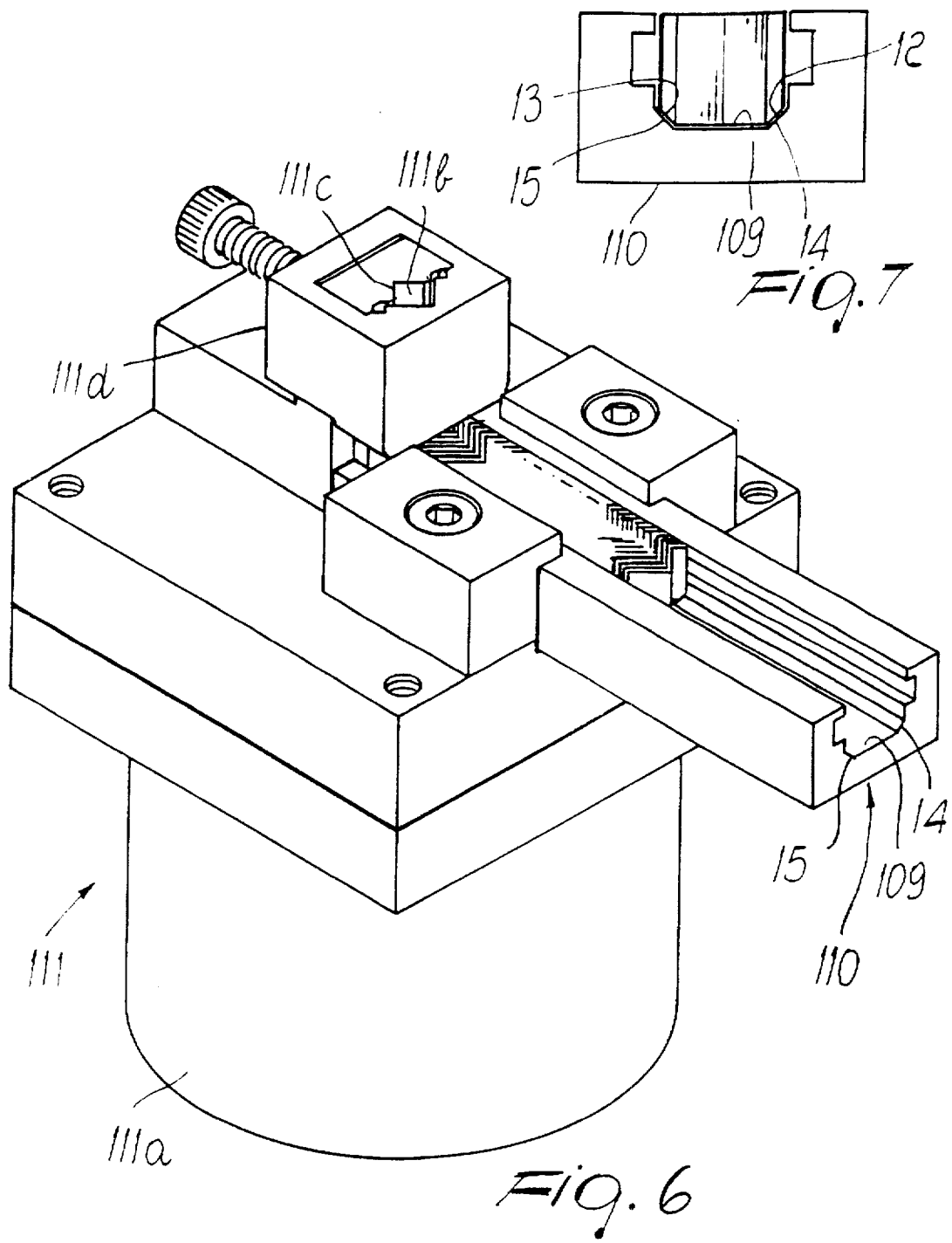

LAMINAR STAPLE FOR JOINING AT AN ANGLE PROFILED STRIPS

BACKGROUND OF THE INVENTION

The present invention relates to a laminar staple for joining at an angle profiled strips, particularly for manufacturing frames, frameworks and the like.

In the manufacture of frames, picture frames or other similar wood frameworks the strips are conventionally joined at an angle by using laminar staples driven astride the joining plane formed by the mutually adjacent arrangement of the preliminary chamfered ends of the strips. Staples of this kind are disclosed in U.S. Pat. Nos. 1.959.360, 3.507, 384, 4.058.047, 4.514.126, in French patents No. 877.266, 2.318.715, in Italian patent No. 1.041.095, in UK patent No. 1.165.482 and in German patents No. 2.102.501 and 1.400.848.

Laminar staples are also commercially available which comprise a steel plate folded so as to define two mutually perpendicular walls and two ribs or ridges perpendicular to said walls and protruding outwards so that the staple has a substantially W-shaped profile.

Staples of this kind are disclosed in U.S. Pat. Nos. 29.957, 4.681.498, 5.336.038 and in French patents No. 2.318.715 and 2.525.949.

When two profiled strips have to be joined together, which have been cut at an angle for example of 45° in order to be joined at right angle, said W-shaped staples are driven astride the joining plane formed by the mutually adjacent arrangement of the strips so that the corner defined by the perpendicular walls and lying in the centerline plane of the staple, lies on the joining plane. In order to facilitate insertion of the staples one W-shaped edge thereof is sharpened so as to define a cutting edge.

Such staples, for being used, are held together to form a stick which is then positioned into the channel of a loader of a staple driving machine. The positioning however requires a certain degree of attention from the user which is supposed to always note the advancing direction of the staples. A wrong orientation of the stick will obviously compromise the machine functioning.

SUMMARY OF THE INVENTION

The principal aim of the present invention is to provide a staple which allows to avoid the above-mentioned drawbacks of wrong orientation within the loader of a staple driving machine.

Within the scope of this aim, an object of the present invention is to provide a staple which, after being driven in a workpiece, is less visible than conventional staples.

This aim and this object are achieved by a staple the features whereof are defined in the appended claims.

BRIEF DESCRIPTION OF THE DRAWINGS

Further characteristics and advantages of the present invention will become apparent from the following detailed description on the base of the accompanying drawings, wherein:

FIG. 2 shows a W-shaped staple;

FIG. 3 shows a stick formed by laminar staples of the type shown in FIG. 2;

FIG. 4 shows a staple according to the present invention;

FIG. 5 shows a stick assembled with the staples according to FIG. 4;

FIG. 6 is a perspective view from above of a staple driving machine having a loader modified to permit driving in of the staples according to FIG. 4;

FIG. 7 is an axial view of the loader of the machine according to FIG. 6;

Figure 1:
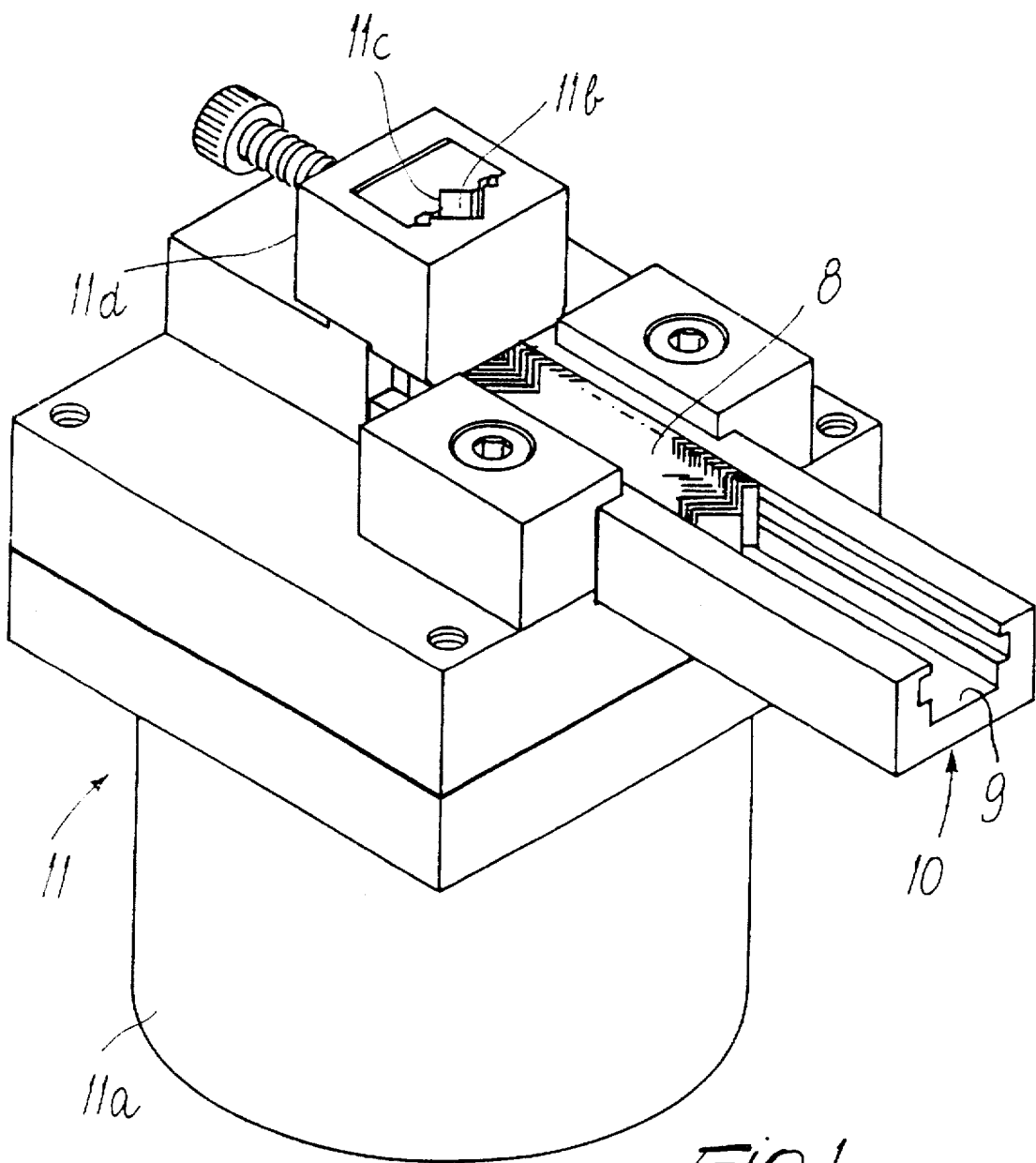
FIG. 1 is a perspective view from above of a conventional staple driving machine in which some components have been removed for the sake of clarity.

DESCRIPTION OF THE PREFERRED EMBODIMENTS.

It will be noted that in conventional staple driving machines it may often happen that the positioning of a new stick into the channel 9 to replace an exhausted one, may easily be carried out in a wrong manner owing to the hurry or in-attention of the user, who is not aware of the correct orientation of the stick. With respect to a single correct orientation with which they advance towards the driving track 11c, the sticks may in fact be oriented in the opposite direction or upside-down or according to both erroneous orientations.

With reference to FIG. 2, the staple is generally designated by the reference numeral 1 and comprises a steel plate having a rectangular configuration and folded along a centerline plane P so as to form two mutually perpendicular walls 2, 3, defining a corner 4. The marginal portions of the walls 2, 3 are bent perpendicularly with respect to the walls so as to form two ribs 5, 6 extending outwards with respect to the right angle included by the walls 2, 3; thereby the staple assumes a W-shaped profile.

The edge of the staple which should be driven into the workpiece is provided with a cutting edge 7 sharpened on one side or on both sides.

Advantageously, the ribs 5, 6 adjacent to the cutting edge 7 diverge with respect to the centerline plane P, thus forming two arcuated portions 5a, 6a.

In order to be used in a staple driving machine the staples 1 are assembled together to form a stick 8 and are held together by means of a tape of adhesive material that joins the cutting edges.

A stick thus formed is positioned into the channel 9 of a loader 10 of a conventional staple driving machine generally designated by the reference numeral 11. Only the pneumatic driving cylinder 11a of such a machine is illustrated, said cylinder having a striking rod 11b which is slidingly mounted within the drive track 11c formed in a head 11d that is secured on the cylinder 11a.

The channel 9 is substantially defined by an element having a U-shaped cross-section and is closed by a lid (not shown) to avoid that a stick 8 positioned within the channel may fall out.

The channel 9 has a complementary cross section with respect to that of the staple stick 8 which, in the example, has a rectangular configuration.

The staple shown in FIG. 4 is substantially identical to the one shown in FIG. 2 so that, for the sake of convenience, the same components or parts are designated by the same reference numerals, to which 100 has been added.

The staple 101, with respect to staple 1, differs only owing to the removal of the corners of the ribs 105, 106 opposite to the cutting edge 107, thus two respective triangular chamfers 12, 13 being obtained.

In order to allow a stick 108 of staples 101 to be positioned within the loader 110, two raised portions or reliefs 14, 15 are formed in the channel 109 which have a triangular cross section complementary to that of the chamfers 12, 13.

The reliefs 14, 15 avoid that a stick 108 may be fully accomodated within the channel 109 if the stick is not correctly oriented inside the channel in such a way that the chamfers 12, 13 correspond to the reliefs 14, 15.

In this way it is prevented that the stick 108 may be placed overturned, i.e., with the cutting edges facing the bottom of the channel 109, since in this case the stick would protrude from the channel and closing of the loader and advancing of the staples towards the drive track 111c would be impossible.

Figure 8:
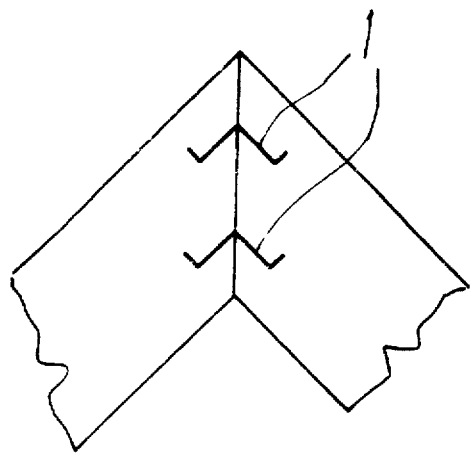
FIG. 8 shows the joining zone of two strips secured together with a conventional staple.
Figure 9:
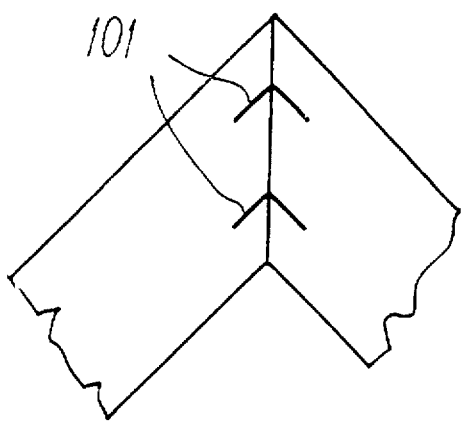
FIG. 9 shows the joining zone of two strips secured together with a staple according to the present invention.

The staple according to the present invention achieves the intended aim and object. In particular it will be observed that the ribs 105, 106, when the staples have been completely driven in the strips, are no longer visible and therefore the joining plane is cleaner (FIG. 9) with respect to that obtainable with conventional staples (FIG. 8).

The invention thus described is susceptible of numerous modifications and variations. For example, by differentiating the height of the chamfers it is possible to prevent that the stick is placed inside the channel not only upside-down, but also in the opposite direction.

Figure 10:
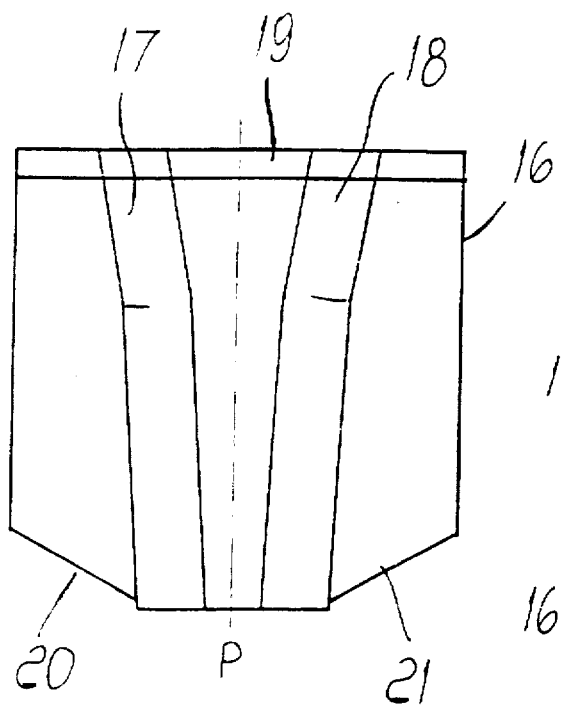
FIGS. 10 and 11 show a front and a perspective view of a staple in a different embodiment of the invention.
Figure 11:
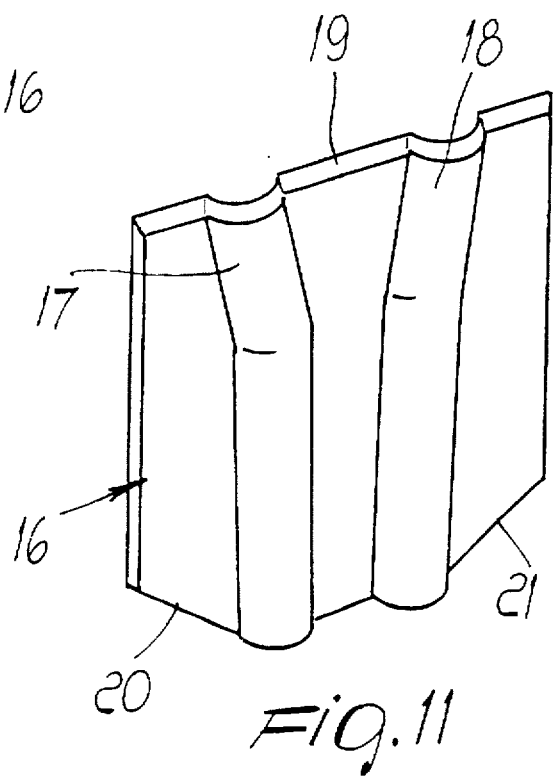

The inventive concept may also be applied to laminar staples comprising a rectangular plate 16 (FIGS. 10, 11) having ribs 17, 18 of semi-circular cross section formed symmetrically to the centerline plane P and a cutting edge 19 along an edge perpendicular to the centerline plane. At the corners of the side opposite to the cutting edge, chamfers 20, 21 are provided which allow the correct orientation of the staple stick inside the loader.

What is claimed is:

1. A laminar staple for staple driving machines having a loader, said staple comprising two walls substantially perpendicular to each other, the walls defining a corner and two ribs, the ribs extending substantially perpendicularly to the walls, said walls and said ribs having a cutting edge, wherein at least one of the ribs is provided at an end opposite to said cutting edge, with a chamfer, each chamfer cooperating with a respective relief formed in a guide channel of the loader that is complementary to the width of said staple.

2. A staple according to claim 1, wherein said two ribs are provided, at each end opposite to the cutting edge, with respective chamfers, said chamfers cooperating with each respective relief formed in the channel of said loader.

3. A staple according to claim 2, wherein said chamfers are different one from another.

4. A Laminar staple for staple driving machines comprising: a substantially rectangular plate, said plate having a cutting edge along one side thereof; ribs arranged symmetrically with respect to a centerline plane perpendicular to said cutting edge; at least one chamfer provided at at least one corner of said plate opposite to said cutting edge, each chamfer cooperating with each respective relief formed in a guide channel of a loader which is complementary to the width of said staple and which has at least one relief formed therein.

5. A staple according to claim 4, wherein each corner opposite to said cutting edge is provided with chamfers cooperating with respective reliefs formed in said channel of said loader.

6. A staple according to claim 5, wherein said chamfers are different one from another.

* * * * *